US010539161B2

(12) United States Patent
Arikawa (10) Patent No.: US 10,539,161 B2
(45) Date of Patent: Jan. 21, 2020

(54) ACCUMULATOR

(71) Applicant: EAGLE INDUSTRY CO., LTD., Tokyo (JP)

(72) Inventor: Tatsuhiro Arikawa, Tokyo (JP)

(73) Assignee: EAGLE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 15/769,649

(22) PCT Filed: Oct. 14, 2016

(86) PCT No.: PCT/JP2016/080468
§ 371 (c)(1),
(2) Date: Apr. 19, 2018

(87) PCT Pub. No.: WO2017/069049
PCT Pub. Date: Apr. 27, 2017

(65) Prior Publication Data
US 2018/0306210 A1    Oct. 25, 2018

(30) Foreign Application Priority Data

Oct. 22, 2015   (JP) .................................. 2015-207825

(51) Int. Cl.
*F16L 55/04* (2006.01)
*F15B 1/10* (2006.01)
*F16L 55/053* (2006.01)

(52) U.S. Cl.
CPC ........ *F15B 1/103* (2013.01); *F15B 2201/205* (2013.01); *F15B 2201/3153* (2013.01); *F15B 2201/3157* (2013.01); *F16L 55/053* (2013.01)

(58) Field of Classification Search
CPC .............. F15B 2201/3153; F15B 1/103; F15B 2201/205; F15B 2201/32; F15B 1/32; F15B 1/22; F15B 2201/312; F15B 2201/3158
(Continued)

(56) References Cited

U.S. PATENT DOCUMENTS 4,997,009 A *   3/1991   Niikura .............. B60G 17/0424
                                                        138/30
6,616,247 B2 *  9/2003   Mohr ...................... F15B 1/103
                                                        138/30
(Continued)

FOREIGN PATENT DOCUMENTS

CN   203552701 U   4/2014
CN   103867502 A   6/2014
(Continued)

OTHER PUBLICATIONS

Extended European Search Report dated May 24, 2019 (corresponding to EP 16857364.0).
(Continued)

*Primary Examiner* — Patrick F Brinson
(74) *Attorney, Agent, or Firm* — Harness, Dickey & Pierce, P.L.C.

(57) ABSTRACT

An accumulator capable of suppressing collision of a metal bellows with a pressure vessel. A partition unit 300 includes: a tubular metal bellows 310, one end of which is side fixed to a pressure vessel 200 and which expands and contracts according to pressure in a fluid chamber and pressure in a gas chamber; and a bellows cap 320 which is fixed to another end side of the metal bellows 310, the partition unit 300 further including: a seal member 330 which is provided between the bellows cap 320 and a port 221 and seals a working fluid on the side of the fluid chamber via the metal bellows 310 when the metal bellows 310 contracts; and a (Continued)

sliding unit 350 which is fixed to the bellows cap 320 and slides in an expansion/contraction direction of the metal bellows 310 relative to a stay 400.

9 Claims, 7 Drawing Sheets

(58) Field of Classification Search
USPC .................................................. 138/31, 30
See application file for complete search history.

(56) References Cited

U.S. PATENT DOCUMENTS

| | | | | |
|---|---|---|---|---|
| 6,666,529 B2* | 12/2003 | Mohr | ................. | F15B 1/103 138/30 |
| 6,871,672 B2* | 3/2005 | Kurokawa | ............ | B60T 13/148 138/26 |
| 8,365,772 B2* | 2/2013 | Arikawa | ................. | F15B 1/103 138/30 |
| 2002/0180260 A1 | 12/2002 | Mohr | | |
| 2005/0061379 A1* | 3/2005 | Mori | ................. | F15B 1/103 138/31 |
| 2011/0226370 A1* | 9/2011 | Arikawa | ................. | F15B 1/103 138/30 |
| 2014/0224368 A1* | 8/2014 | Yamashita | .............. | F15B 1/103 138/31 |

FOREIGN PATENT DOCUMENTS

| | | | | |
|---|---|---|---|---|
| DE | 1922070 A1 | 11/1970 | | |
| DE | 10304288 A1 | 5/2004 | | |
| JP | S64-007901 U | 1/1989 | | |
| JP | H03-088001 U | 9/1991 | | |
| JP | 03272301 A | * 12/1991 | ............... | F15B 1/103 |
| JP | 2003-175819 A | 6/2003 | | |
| JP | 3118492 U | 1/2006 | | |

OTHER PUBLICATIONS

Chinese Office Action dated Jul. 10, 2019 with English translation (corresponding to CN 2016800589776).

* cited by examiner

ACCUMULATOR

CROSS-REFERENCE TO RELATED APPLICATIONS

This application is a National Stage of International Application No. PCT/JP2016/080468, filed Oct. 14, 2016 (now WO 2017/069049A1), which claims priority to Japanese Application No. 2015-207825, filed Oct. 22, 2015. The entire disclosures of each of the above applications are incorporated herein by reference.

FIELD

The present disclosure relates to an accumulator which is used for discharging a large amount of energy in a short time and alleviating pressure fluctuations.

BACKGROUND

Figure 6:
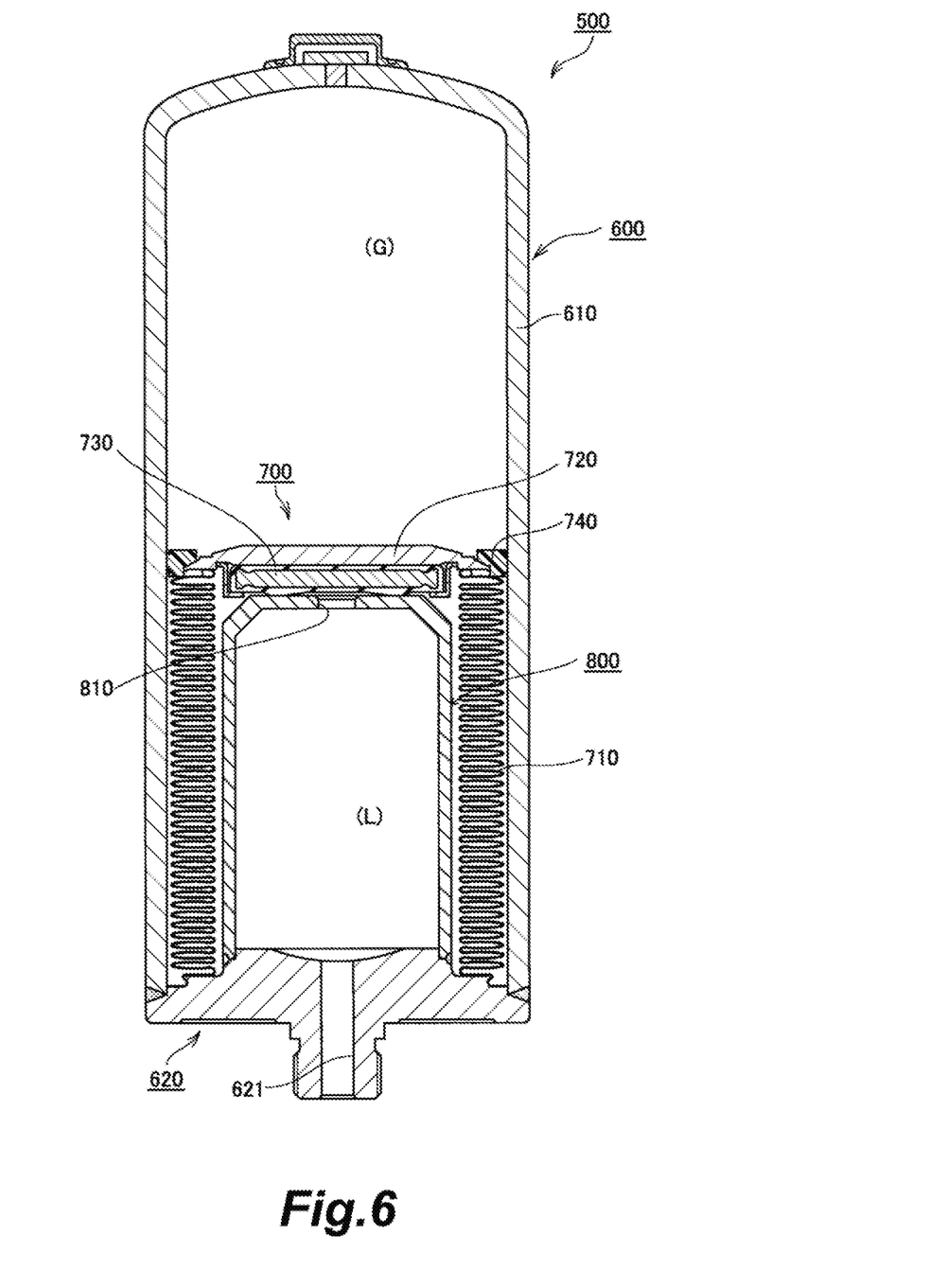
FIG. 6 is a schematic cross-sectional view of an accumulator according to a conventional embodiment.
Figure 7:
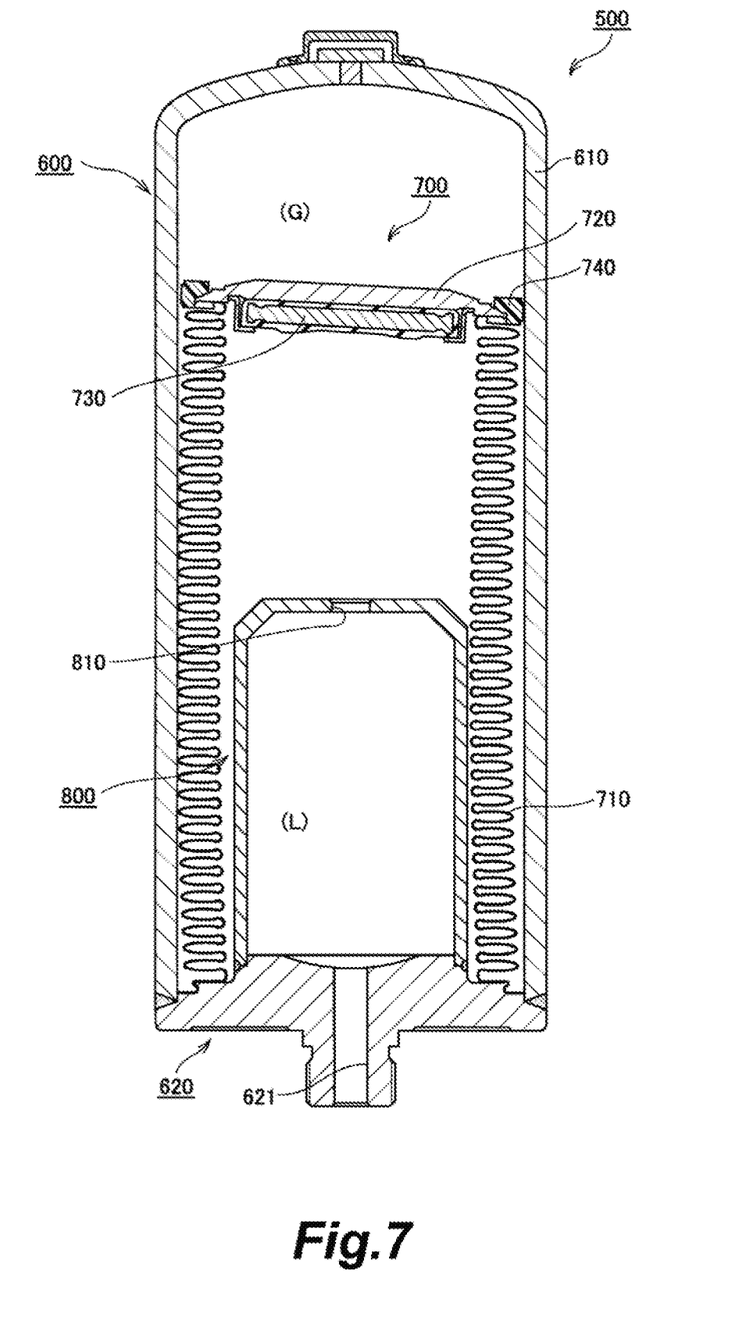
FIG. 7 is a schematic cross-sectional view of the accumulator according to the conventional embodiment.

Conventionally, an accumulator which includes a metal bellows is used for discharging a large amount of energy in a short time and reliving pressure fluctuations. In such an accumulator, in order to prevent the metal bellows from colliding with a pressure vessel when the metal bellows vibrates due to vibrations from the outside, a sliding ring which also has a bearing function is provided at the tip of the metal bellows. Such techniques will be described with reference to FIG. 6 and FIG. 7. Each of FIGS. 6 and 7 is a schematic cross-sectional view of an accumulator according to a conventional embodiment, and FIG. 6 shows a state in which the metal bellows is contracted while FIG. 7 shows a state in which the metal bellows is expanded.

An accumulator 500 according to the conventional embodiment includes a pressure vessel 600, a partition unit 700 which is provided in the pressure vessel 600 and partitions the pressure vessel 600 into a fluid chamber (L) in which a working fluid flows and a gas chamber (G) in which gas is sealed, and a stay 800 which is disposed in the partition unit 700. The pressure vessel 600 is constituted by a bottomed tubular pressure vessel main body 610, and a port formation member 620 which is provided so as to cover an opening portion of the pressure vessel main body 610 and has a port 621. The stay 800 is constituted by a bottomed tubular member which opens on the side of the port 621 and has an opening end portion fixed to the port formation member 620. A through hole 810 is provided at the bottom of the stay 800.

The partition unit 700 includes a tubular metal bellows 710 which has one end side fixed to the port formation member 620, a bellows cap 720 which is fixed to the other end side of the metal bellows 710, and a seal member 730 which is fixed to the bellows cap 720. The metal bellows 710 is configured so as to expand and contract according to pressure in the fluid chamber (L) and pressure in the gas chamber (G). In addition, a sliding ring 740 which also has the bearing function is provided on the outer periphery of the bellows cap 720. The outer peripheral surface of the sliding ring 740 is configured so as to be slidable relative to the inner peripheral surface of the pressure vessel main body 610. This enables the metal bellows 710 to expand and contract smoothly, and the vibration of the metal bellows 710 to be suppressed.

However, depending on various conditions such as the length, liquid storage amount, and magnitude and frequency of the vibration of the metal bellows 710, there is a possibility that the part of the metal bellows 710 in the vicinity of the middle thereof collides with the inner peripheral surface of the pressure vessel main body 610. That is, a clearance is provided between the outer peripheral surface of the sliding ring 740 and the inner peripheral surface of the pressure vessel main body 610. Accordingly, there are cases where the bellows cap 720 tilts when the metal bellows 710 is expanded. Thus, when the bellows cap 720 tilts, there is a possibility that the metal bellows 710 is deformed so as to tilt and the part of the metal bellows 710 in vicinity of the middle thereof collides with the inner peripheral surface of the pressure vessel main body 610 (see FIG. 7). This may cause the metal bellows 710 to be plastically deformed or damaged.

CITATION LIST

Patent Literature

[PTL 1] Japanese Utility Model Application Publication No. S64-7901

[PTL 2] Japanese Utility Model Application Publication No. H03-88001

SUMMARY

Technical Problem

An object of the present disclosure is to provide the accumulator capable of preventing the metal bellows from colliding with the pressure vessel.

Solution to Problem

The present disclosure has adopted the following means in order to solve the above problem.

That is, the accumulator according to the present disclosure is an accumulator including: a pressure vessel having a port serving as an entrance and an exit of a working fluid; a partition unit provided in the pressure vessel and partitioning the pressure vessel into a fluid chamber, in which the working fluid flows, and a gas chamber, in which gas is sealed; and an annular member disposed in the partition unit and fixed to the pressure vessel, wherein the partition unit includes: a tubular metal bellows, one end side of which is fixed to the pressure vessel and which expands and contracts according to pressure in the fluid chamber and pressure in the gas chamber; and a bellows cap which is fixed to another end side of the metal bellows, and the partition unit further includes: a seal member which is provided between the bellows cap and the port and seals the working fluid on a side of the fluid chamber via the metal bellows when the metal bellows expands and contracts; and a sliding unit which is fixed to the bellows cap and slides in an expansion/contraction direction of the metal bellows relative to the annular member.

According to the present disclosure, there is provided the sliding unit which is fixed to the bellows cap and slides in the expansion/contraction direction of the metal bellows relative to the annular member, whereby a centering effect is generated and the tilt of the bellows cap is suppressed. Consequently, it is possible to suppress the tilt of the metal bellows. In addition, the sliding unit is capable of stabilizing the seating position of the seal in a state in which the metal bellows is contracted or expanded (when the seal is seated, the seal is seated at the same position every time the seal is seated), and it is possible to reliably perform sealing.

The sliding unit may include: a fixed member, one end of which is fixed to the bellows cap; and a sliding member which is provided on another end side of the fixed member and slides relative to an outer peripheral surface of the annular member.

Herein, the fixed member may be a tubular member which is provided on a port side of the bellows cap and is provided with a flow path which allows moving in and out of the working fluid therethrough, and the sliding member may be provided on an inner wall surface of the tubular member.

In addition, the sliding unit preferably includes: a fixed member, one end of which is fixed to the bellows cap; and a sliding member which is provided on another end side of the fixed member and slides relative to an inner peripheral surface of the annular member.

Herein, the sliding member may be provided on a port side of the bellows cap and be provided with a flow path which allows moving in and out of the working fluid therethrough, and a sliding portion which slides relative to the inner peripheral surface of the annular member may be provided on an outer peripheral surface side of the sliding member.

Further, one end of the annular member is preferably fixed to an inner wall surface on a port side in the pressure vessel, and another end of the annular member has a bottom plate portion, in which a through hole is preferably formed, and the sliding unit preferably includes a fixed member which is fixed to the bellows cap and is disposed so as to be slidable relative to a bearing provided on an inner peripheral surface of the through hole.

Herein, the fixed member may be provided with a flow path which allows moving in and out of the working fluid therethrough.

In addition, the sliding unit preferably includes a fixed member, one end of which is fixed to the bellows cap and which slides relative to a bearing provided on an inner peripheral surface of the annular member.

In addition, a sliding ring which is configured so as to be slidable relative to an inner peripheral surface of the pressure vessel may be provided on an outer periphery of the bellows cap. Consequently, the tilt of the metal bellows is further suppressed.

Note that the individual configurations described above can be adopted while combined as much as possible.

Advantageous Effects of the Disclosure

As described thus far, according to the present disclosure, it is possible to prevent the metal bellows from colliding with the pressure vessel.

DETAILED DESCRIPTION

Hereinbelow, with reference to the drawings, the best mode for carrying out the disclosure will be illustratively described in detail based on embodiments. It should be noted that, however, unless otherwise specified expressly, the dimensions, materials, shapes, and relative arrangements of components described in the embodiments are not intended to limit the scope of the present disclosure to the dimensions, materials, shapes, and relative arrangements thereof.

(Embodiment 1)

Figure 1:
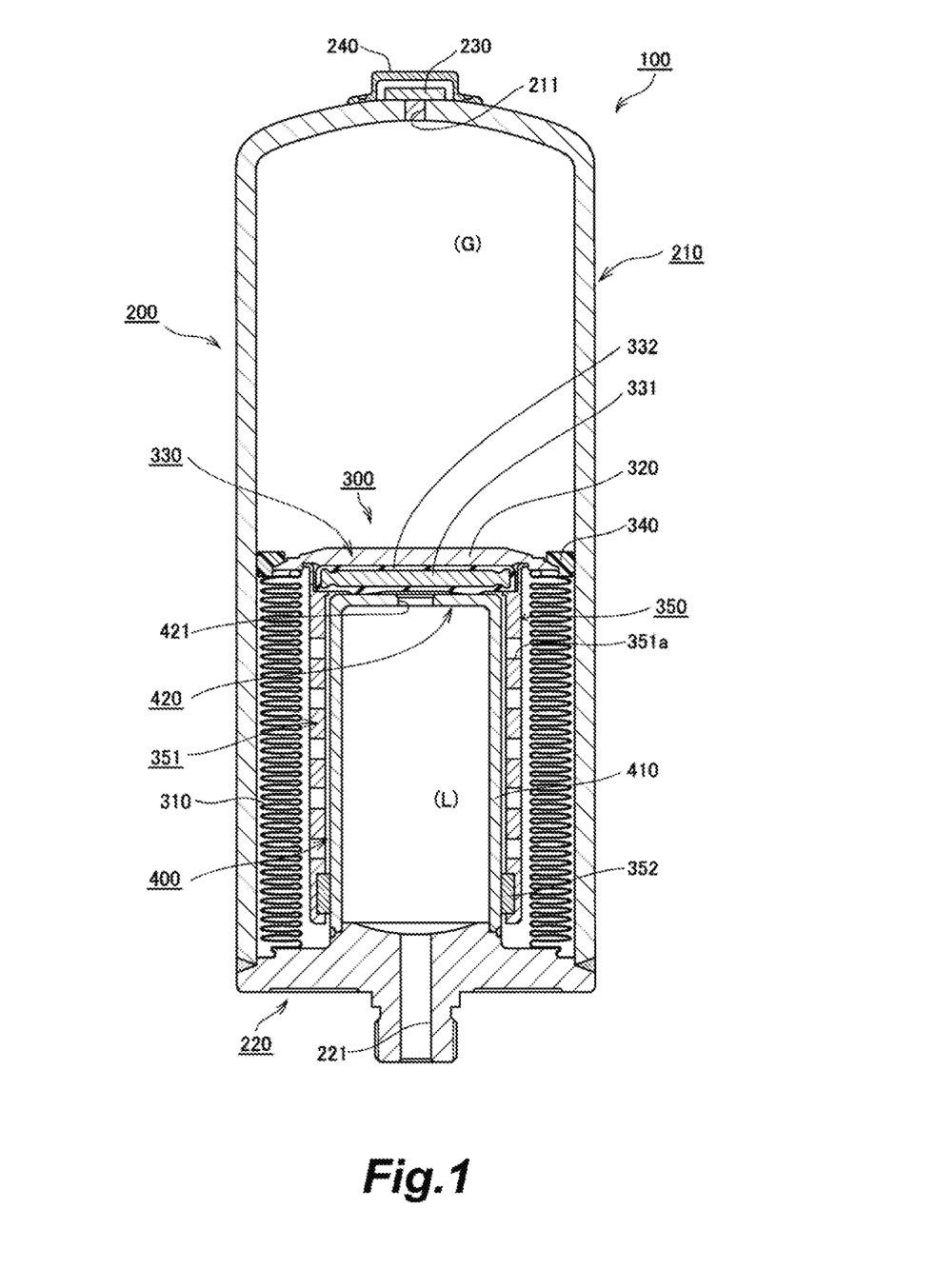
FIG. 1 is a schematic cross-sectional view of an accumulator according to Embodiment 1 of the present disclosure.
Figure 2:
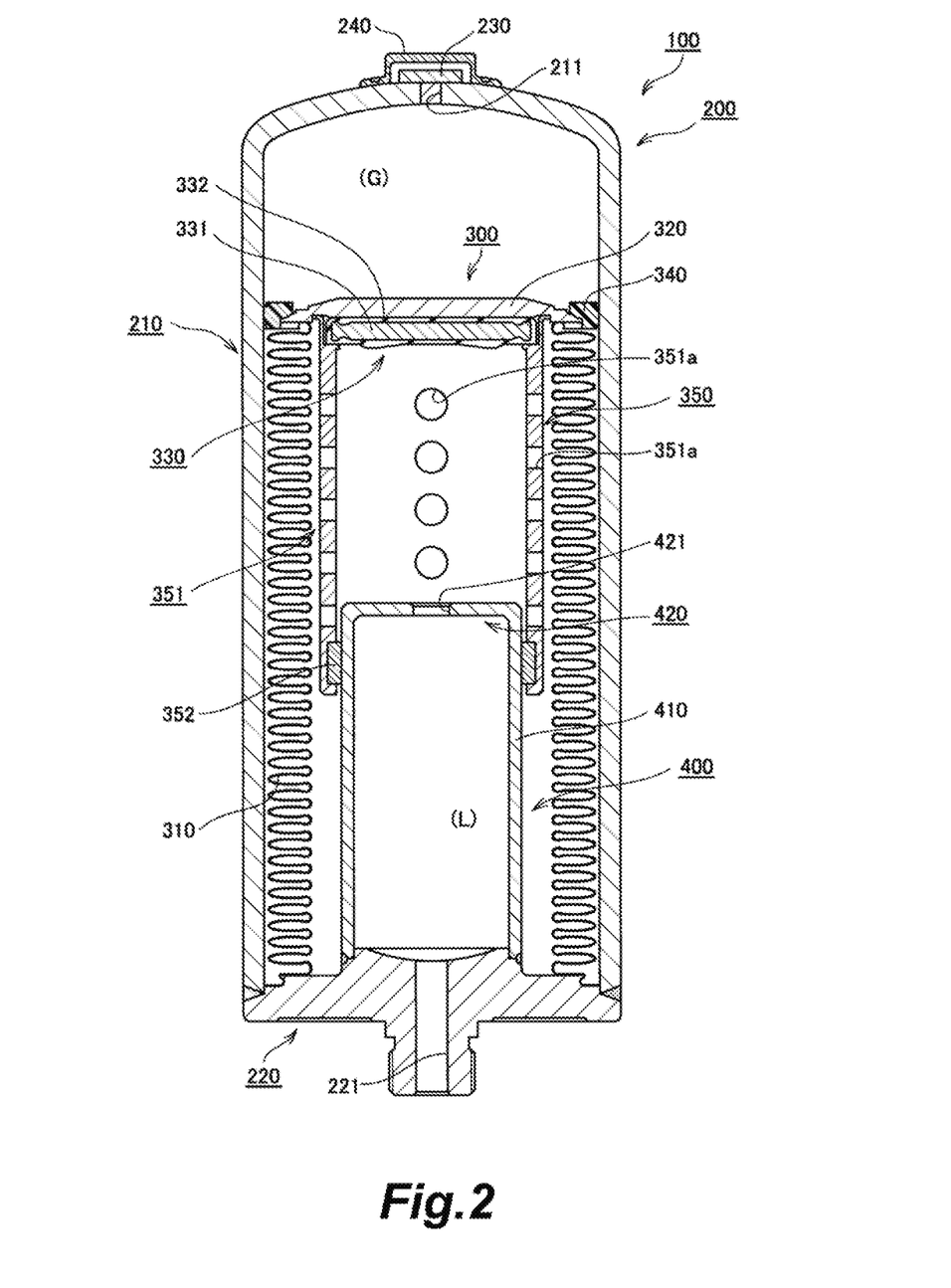
FIG. 2 is a schematic cross-sectional view of the accumulator according to Embodiment 1 of the present disclosure.

With reference to FIG. 1 and FIG. 2, an accumulator according to Embodiment 1 of the present disclosure will be described. Each of FIGS. 1 and 2 is a schematic cross-sectional view of the accumulator according to Embodiment 1 of the present disclosure, and FIG. 1 shows a state in which a metal bellows is contracted while FIG. 2 shows a state in which the metal bellows is expanded.

<Entire Accumulator>

A description will be given of the overall configuration of the accumulator according to Embodiment 1 of the present disclosure. An accumulator 100 according to the present embodiment can be used for discharging a large amount of energy in a short time and alleviating pressure fluctuations. As a more specific example, the accumulator can be used for alleviating pulsation in a pipe in which oil flows in an automobile. The accumulator 100 according to the present embodiment is rotationally symmetric with respect to the central axis except part of members (members which constitute a sliding unit and the like).

The accumulator 100 according to the present embodiment includes a pressure vessel 200, a partition unit 300 which is provided in the pressure vessel 200 and partitions the pressure vessel 200 into a fluid chamber (L) in which a working fluid flows and a gas chamber (G) in which gas is sealed, and a stay 400 as an annular member which is disposed in the partition unit 300.

The pressure vessel 200 is formed of metal, and is constituted by a bottomed tubular pressure vessel main body 210, and a port formation member 220 which is provided so as to cover an opening portion of the pressure vessel main body 210. The body portion of the pressure vessel main body 210 is cylindrical. On the bottom side of the pressure vessel main body 210, an injection hole 211 for injection of gas is provided. After the gas is injected, a plug 230 is press-fitted into the injection hole 211. Note that a plug guide 240 is fixed to the bottom surface of the pressure vessel main body 210 such that the plug 230 is not disconnected easily after the plug 230 is press-fitted and a tool for attachment of the accumulator can be mounted. In addition, a port 221 which serves as an entrance and exit of the working fluid is provided in the port formation member 220.

The stay 400 is constituted by a bottomed tubular member which opens on the side of the port 221 and has an opening end portion fixed to the port formation member 220 (an inner wall surface on the side of the port 221 in the pressure vessel 200). That is, the stay 400 has a tubular portion 410 and a bottom plate portion 420. Note that the tubular portion 410 in the present embodiment is cylindrical. A through hole 421 is provided at the bottom of the stay 400 (the center of the bottom plate portion 420).

The partition unit 300 includes a tubular metal bellows 310 which has one end side fixed to the port formation member 220, a bellows cap 320 which is fixed to the other end side of the metal bellows 310, and a seal member 330 which is fixed to the bellows cap 320.

The metal bellows 310 is a pleated substantially cylindrical member in which a plurality of annular ridge portions and a plurality of annular valley portions are alternately formed. The metal bellows 310 is disposed in an area inside the inner peripheral surface of the pressure vessel 200 (the body portion of the pressure vessel main body 210) and outside the outer peripheral surface of the stay 400 (the tubular portion 410). In addition, the metal bellows 310 is configured so as to expand and contract according to pressure in the fluid chamber (L) and pressure in the gas chamber (G).

Space in the pressure vessel 200 is separated into the gas chamber (G) and the fluid chamber (L) by the thus configured metal bellows 310 and the bellows cap 320 fixed to the other end side of the metal bellows 310. Herein, a specific amount of gas is sealed in the gas chamber (G). Fluid pressure in the fluid chamber (L) changes according to the flow of the working fluid. This enables the metal bellows 310 to expand and contract so as to maintain the balance between the pressure in the gas chamber (G) and the fluid pressure in the fluid chamber (L).

The seal member 330 is provided between the bellows cap 320 and the port 221. More specifically, in the present embodiment, the seal member 330 is fixed to the surface of the bellows cap 320 on a side opposing the bottom surface of the stay 400. The seal member 330 is constituted by a substantially disk-shaped member 331 made of metal, and a rubbery elastic body 332 which covers the substantially disk-shaped member 331. The seal member 330 plays a role in preventing flow of the working liquid via the through hole 421 by coming into close contact with the bottom surface of the stay 400 when the metal bellows 310 contracts. That is, when the fluid pressure in the fluid chamber (L) is not more than a specific value, the metal bellows 310 contracts and the seal member 330 comes into close contact with the bottom plate portion 420 in the stay 400. This enables the through hole 421 to be covered (see FIG. 1). In addition, when the flow of the working liquid via the through hole 421 is prevented by the seal member 330, part of the working fluid flowing in the fluid chamber (L) is trapped in annular space formed by the outer peripheral surface of the tubular portion 410 in the stay 400, the seal member 330, the inner peripheral surface of the metal bellows 310, and the like. That is, the seal member 330 exerts a function of sealing the working fluid on the side of the fluid chamber (L) via the metal bellows 310 when the metal bellows 310 contracts. Consequently, a state in which the fluid pressure (liquid pressure) in the annular space is substantially equal to pressure (air pressure) on the side of the outer peripheral surface of the metal bellows 310 is maintained, and the metal bellows 310 is prevented from being deformed.

In addition, on the outer periphery of the bellows cap 320, a sliding ring 340 which also has a bearing function is provided. As a material of the sliding ring 340, it is possible to use metal, resin, and rubber. The outer peripheral surface of the sliding ring 340 is configured so as to be slidable relative to the inner peripheral surface of the pressure vessel main body 210. This enables the metal bellows 310 to expand and contract smoothly and the vibration of the metal bellows 310 to be suppressed. Note that an area outside the outer peripheral surface of the metal bellows 310 is also part of the gas chamber (G), and hence the sliding ring 340 is configured so as not to prevent the gas from flowing. For example, it is possible to adopt a configuration in which gaps are provided at several locations in a circumferential direction between the outer peripheral surface of the sliding ring 340 and the inner peripheral surface of the pressure vessel main body 210.

In addition, in the accumulator 100 according to the present embodiment, there is provided a centering mechanism which performs centering of the bellows cap 320 with respect to the pressure vessel 200 (centering of the bellows cap 320 and the stay 400). Hereinbelow, the centering mechanism will be described in detail.

<Centering Mechanism>

The centering mechanism according to the present embodiment has a sliding unit 350 which is fixed to the bellows cap 320 and slides in an expansion/contraction direction of the metal bellows 310 relative to the stay 400 when the metal bellows 310 expands and contracts. The sliding unit 350 is structured to secure the moving in and out of the working fluid between the inner peripheral surface side and the outer peripheral surface side of the stay 400 in a state in which the seal member 330 is apart from the bottom surface of the stay 400.

The sliding unit 350 according to the present embodiment is constituted by a fixed member 351 which has one end fixed to the bellows cap 320, and a sliding member 352 which is provided on the other end side of the fixed member 351 and slides relative to the outer peripheral surface of the stay 400. The fixed member 351 is a tubular member which is provided on the side of the port 221 of the bellows cap 320 and is provided with a plurality of flow path holes 351a serving as flow paths which allow the moving in and out of the working fluid therethrough. The sliding member 352 is provided on the inner wall surface of the tubular member. More specifically, the fixed member 351 is constituted by a substantially cylindrical member, and the cylindrical sliding member 352 which exerts the bearing function is fixed to the inner peripheral surface of the fixed member 351 in the vicinity of the other end thereof. As a material of the sliding member 352, metal, resin, and rubber may be used.

Thus, in the sliding unit 350 according to the present embodiment, the body portion of the fixed member 351 is provided with a plurality of the flow path holes 351a. Consequently, the moving in and out of the working fluid is secured between the inner peripheral surface side and the outer peripheral surface side of the stay 400 in the state in which the seal member 330 is apart from the bottom surface of the stay 400.

Note that the present embodiment has described the case where the sliding member 352 is constituted by the cylindrical member, but the sliding member in the present disclosure is not limited to the cylindrical member. That is, what is essential is that the centering function is exerted, and hence it is possible to adopt, e.g., a configuration in which the sliding members are disposed at three or more locations at regular intervals in the circumferential direction. In addition, the present embodiment has described the case where the fixed member 351 is constituted by the tubular member (the substantially cylindrical member), but the fixed member in the present disclosure is not limited to the tubular member. For example, in the case where the configuration in which the sliding members are provided at three locations at regular intervals in the circumferential direction is adopted, it is possible to adopt a configuration in which slender plate-like members each having one end fixed to the bellows cap 320 and each provided with one sliding member in the vicinity of the other end are disposed at three locations. In this case, it becomes possible to cause the working fluid to flow from a gap between adjacent plate-like members even without providing the flow path hole.

<Advantages of the Accumulator According to the Present Embodiment>

According to the thus configured accumulator 100 of the present embodiment, there is provided the centering mechanism having the sliding unit 350 which is fixed to the bellows cap 320 and slides relative to the stay 400. Consequently, the tilt of the bellows cap 320 can be suppressed, and it is possible to suppress the tilt of the metal bellows 310. Therefore, it is possible to prevent the metal bellows 310 from colliding with the pressure vessel 200 (the pressure vessel main body 210). In addition, with the centering effect by the sliding unit 350, it is possible to stabilize the seating position of the seal member 330 with respect to the bottom plate portion 420 of the stay 400 in a state in which the metal bellows 310 is contracted. That is, when the seal member 330 is seated, the seal member 330 can be seated at the same position every time the seal member 330 is seated. This can achieve reliable sealing performance. Consequently, even in the case where the area of the bottom plate portion 420 is small, a seal position is not misaligned and it becomes possible to reliably perform the sealing.

In addition, since the sliding unit 350 is structured to secure the moving in and out of the working fluid between the inner peripheral surface side and the outer peripheral surface side of the stay 400 in the state in which the seal member 330 is apart from the bottom surface of the stay 400, the working fluid is not prevented from flowing. Further, since the sliding ring 340 which is configured so as to be slidable relative to the inner peripheral surface of the pressure vessel 200 (the pressure vessel main body 210) is provided on the outer periphery of the bellows cap 320, the tilt of the metal bellows 310 is further suppressed.

(Embodiment 2)

Figure 3:
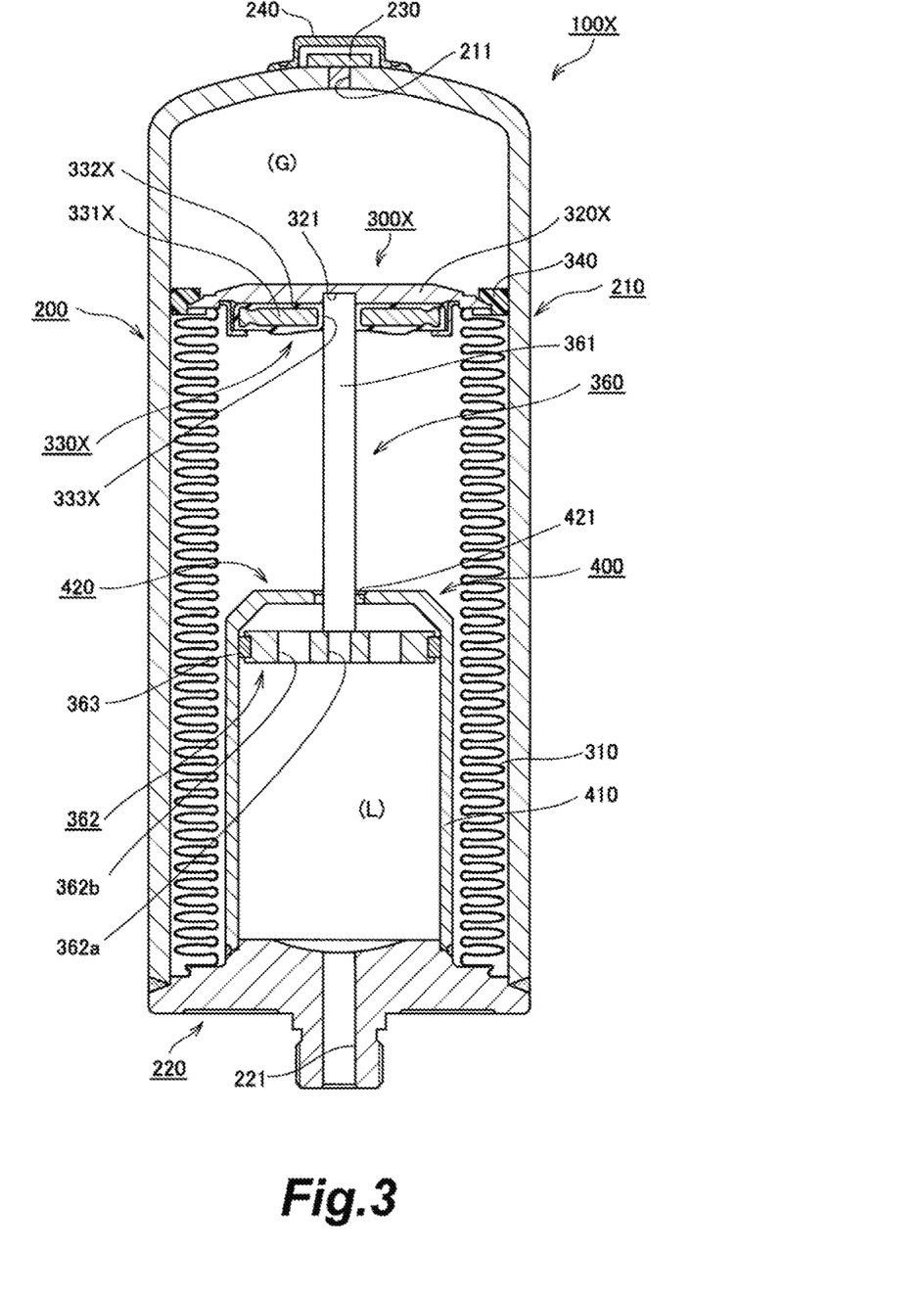
FIG. 3 is a schematic cross-sectional view of an accumulator according to Embodiment 2 of the present disclosure.

FIG. 3 shows Embodiment 2 of the present disclosure. The present embodiment describes a configuration in which the structure related to the sliding unit is different from that in Embodiment 1. The other configurations and operations are the same as those in Embodiment 1, and hence the same components as those in Embodiment 1 are designated by the same reference numerals as those in Embodiment 1, and the description thereof will be appropriately omitted. FIG. 3 is a schematic cross-sectional view of an accumulator according to Embodiment 2 of the present disclosure, and shows a state in which the metal bellows is expanded.

In an accumulator 100X according to the present embodiment, the structure related to the sliding unit 360 is different from that in the case of Embodiment 1, and the basic configurations and operations of the pressure vessel 200 and the stay 400 are the same as those in Embodiment 1 though the shapes thereof are partially different from those in Embodiment 1.

Similarly to Embodiment 1, a partition unit 300X according to the present embodiment also includes the metal bellows 310, a bellows cap 320X, and a seal member 330X. In addition, the sliding ring 340 is provided on the outer periphery of the bellows cap 320X, and a sliding unit 360 is provided in the bellows cap 320X. The configurations of the metal bellows 310 and the sliding ring 340 are the same as those in the case of Embodiment 1. The basic functions of the bellows cap 320X and the seal member 330X are the same as those in Embodiment 1, but the shapes thereof are different from those in Embodiment 1 because the structure of the sliding unit 360 is different.

The sliding unit 360 according to the present embodiment is constituted by a rod 361 as a fixed member which has one end fixed to the bellows cap 320X, and a sliding member 362 which is fixed to the other end side of the rod 361 and is provided with a sliding portion 363 which slides relative to the inner peripheral surface of the stay 400 as the annular member on the outer peripheral surface side of the sliding member 362.

One end of the rod 361 is fixed in a state in which the one end is fitted in a concave portion 321 provided in the bellows cap 320X. In the seal member 330X according to the present embodiment, an insertion hole 333X through which the rod 361 is inserted is provided at the center. That is, the seal member 330X according to the present embodiment is constituted by a substantially disk-shaped member 331X made of metal which has the through hole at the center, and a rubbery elastic body 332X which covers the substantially disk-shaped member 331X. The rod 361 is disposed such that the other end thereof enters the internal space of the stay 400 from the through hole 421 of the stay 400 and an annular gap is formed between the rod 361 and the inner peripheral surface of the through hole 421.

The sliding member 362 is constituted by a substantially disk-shaped member which is provided with a fitting hole 362a in which the tip of the rod 361 is fitted, and a plurality of flow path holes 362b serving as flow paths which allow moving in and out of the working fluid therethrough. The sliding member 362 is provided on the side of the port 221 relative to the bellows cap 320X. In addition, the cylindrical sliding portion 363 is provided on the outer peripheral surface side of the sliding member 362. The sliding portion 363 may be configured by fixing another member to the sliding member 362 or may also be configured by forming a coating on the sliding member 362. Note that, as a material of the sliding portion 363, metal, resin, and rubber may be used.

In a case where the thus configured sliding unit 360 is used as well, similarly to Embodiment 1, the centering mechanism which performs the centering of the bellows cap 320X and the stay 400 is constituted. In addition, the annular gap is formed between the rod 361 and the inner peripheral surface of the through hole 421, and the sliding member 362 is provided with a plurality of the flow path holes 362b. Consequently, the moving in and out of the working fluid is secured between the inner peripheral surface side and the outer peripheral surface side of the stay 400 in a state in which the seal member 330X is apart from the bottom surface of the stay 400.

Note that the present embodiment has described the case where the sliding portion 363 is constituted by the cylindrical portion (member), but the sliding portion in the present disclosure is not limited to the cylindrical portion (member). That is, what is essential is that the centering function is exerted, and hence it is possible to adopt, e.g., a configuration in which the sliding portions are disposed at three or more locations at regular intervals in the circumferential direction. In addition, the present embodiment has described the case where the sliding member 362 is constituted by the substantially disk-shaped member, but the sliding member in the present disclosure is not limited to the substantially disk-shaped member. For example, by adopting a configuration in which sliding portions are provided at three locations at regular intervals in the circumferential direction, it is possible to use a plate-like member having parts which expand radially in three directions from the center as the sliding member. In this case, it becomes possible to cause the working fluid to flow from a gap between adjacent portions of the parts which expand in three directions even without providing the flow path hole. In addition, the present embodiment has described the configuration which includes one rod 361, but the number of the rods is not limited to one in the present disclosure. For example, it is also possible to adopt a configuration which includes a plurality of rods.

In the thus configured accumulator 100X according to the present embodiment as well, it is possible to obtain the same effects as those in Embodiment 1. Note that it is also possible to adopt a configuration in which the sliding unit 350 described in Embodiment 1 is added to the configuration of the accumulator 100X according to the present embodiment.

(Embodiment 3)

Figure 4:
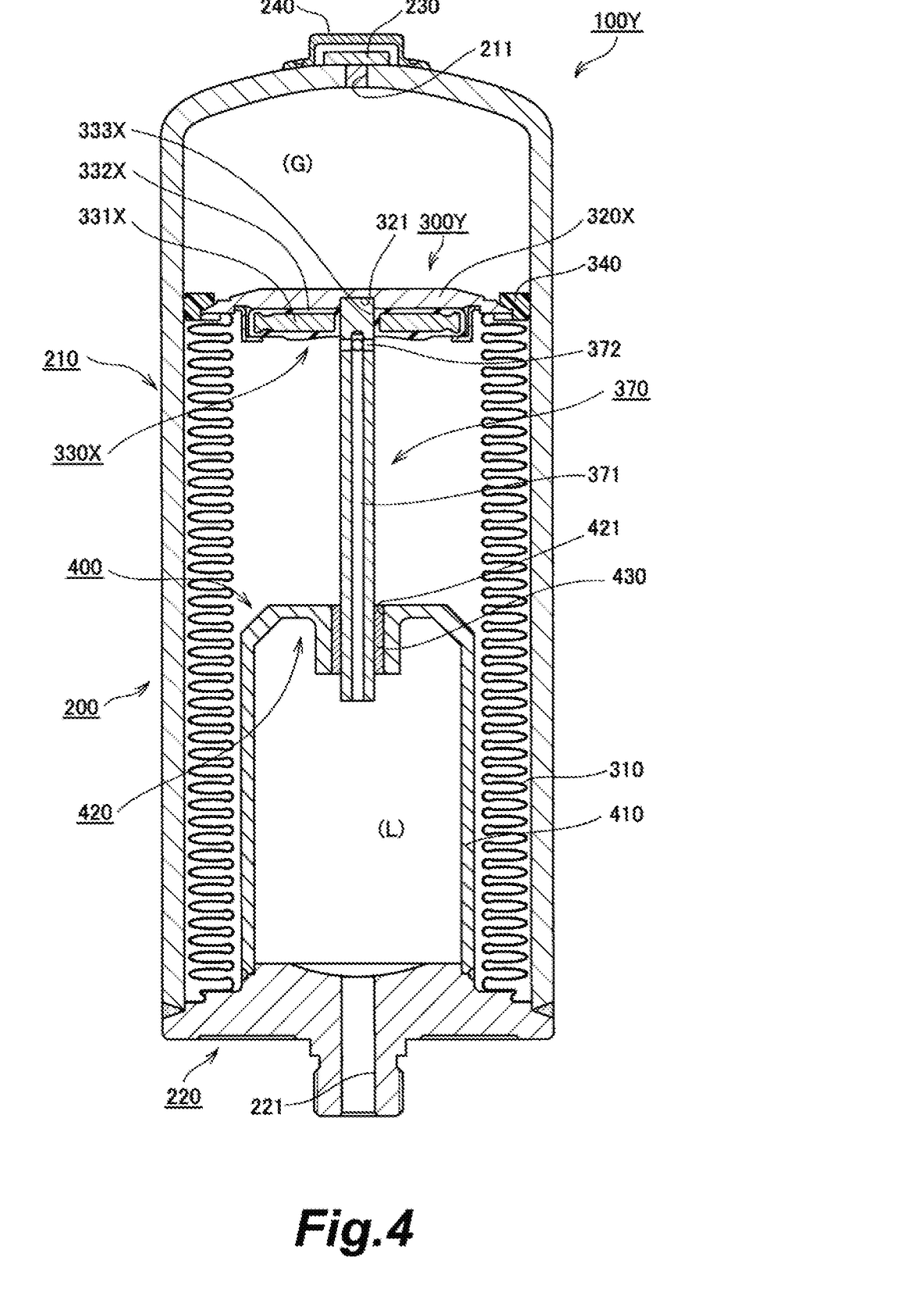
FIG. 4 is a schematic cross-sectional view of an accumulator according to Embodiment 3 of the present disclosure.

FIG. 4 shows Embodiment 3 of the present disclosure. The present embodiment describes a configuration in which structure related to a sliding unit is different from that in Embodiment 1. The other configurations and operations are the same as those in Embodiment 1, and hence the same components as those in Embodiment 1 are designated by the same reference numerals as those in Embodiment 1, and the description thereof will be appropriately omitted. In addition, with regard to the same configurations as those in Embodiment 2 as well, the same components as those in Embodiment 2 are designated by the same reference numerals as those in Embodiment 2, and the description thereof will be appropriately omitted. FIG. 4 is a schematic cross-sectional view of an accumulator according to Embodiment 3 of the present disclosure, and shows the state in which the metal bellows is expanded.

In an accumulator 100Y according to the present embodiment, a structure related to a sliding unit is different from that in Embodiment 1, and the basic configurations and operations of the pressure vessel 200 and the stay 400 are the same as those in Embodiment 1 though the shapes thereof are partially different from those in Embodiment 1.

Similarly to Embodiment 1, a partition unit 300Y according to the present embodiment includes the metal bellows 310, the bellows cap 320X, and the seal member 330X. In addition, the sliding ring 340 is provided on the outer periphery of the bellows cap 320X, and the sliding unit is provided in the bellows cap 320X. The configurations of the metal bellows 310 and the sliding ring 340 are the same as those in Embodiment 1. In addition, the configurations of the bellows cap 320X and the seal member 330X are the same as those in Embodiment 2.

The sliding unit according to the present embodiment is constituted by a rod 370 as a fixed member which has one end fixed to the bellows cap 320X. The other end of the rod 370 enters the internal space of the stay 400 from the through hole 421 provided in the stay 400 as the annular member, and is disposed so as to be slidable relative to a bearing 430 provided on the inner peripheral surface of the through hole 421. Note that the bearing 430 may be constituted by a cylindrical member fixed to the stay 400 or may also be configured by forming a coating on the inner peripheral surface of the through hole 421. As a material of the bearing 430, metal, resin, and rubber may be used. In addition, the rod 370 is formed with a flow path which allows the moving in and out of the working fluid between the inside and the outside of the stay 400 in a state in which the seal member 330X is apart from the bottom surface of the stay 400. More specifically, this flow path is constituted by a first passage 371 which extends so as to include the central axis of the rod 370, and a second passage 372 which extends so as to connect the first passage 371 and the outer peripheral surface of the rod 370. The second passage 372 is provided in the vicinity of the seal member 330X.

In a case where the thus configured sliding unit (the rod 370) is used as well, similarly to Embodiment 1, the centering mechanism which performs the centering of the bellows cap 320X and the stay 400 is constituted. In addition, the rod 370 is provided with the first passage 371 and the second passage 372. Consequently, the moving in and out of the working fluid is secured between the inner peripheral surface side and the outer peripheral surface side of the stay 400 in the state in which the seal member 330X is apart from the bottom surface of the stay 400.

In the thus configured accumulator 100Y according to the present embodiment as well, it is possible to obtain the same effects as those in the case of Embodiment 1. Note that it is also possible to adopt a configuration in which the sliding unit 350 described in Embodiment 1 is added to the configuration of the accumulator 100Y according to the present embodiment. In addition, it is also possible to adopt a configuration in which the sliding member 362 and the sliding portion 363 in the sliding unit 360 described in Embodiment 2 are added to the configuration of the accumulator 100Y according to the present embodiment. Further, it is also possible to adopt a configuration in which the sliding unit 350 described in Embodiment 1 is added to the configuration of the accumulator 100Y according to the present embodiment and the sliding member 362 and the sliding portion 363 in the sliding unit 360 described in Embodiment 2 are also added thereto. In addition, the present embodiment has described the configuration which includes one rod 370, but the number of the rods in the present disclosure is not limited to one. For example, it is possible to adopt a configuration which includes a plurality of the rods.

(Embodiment 4)

Figure 5:
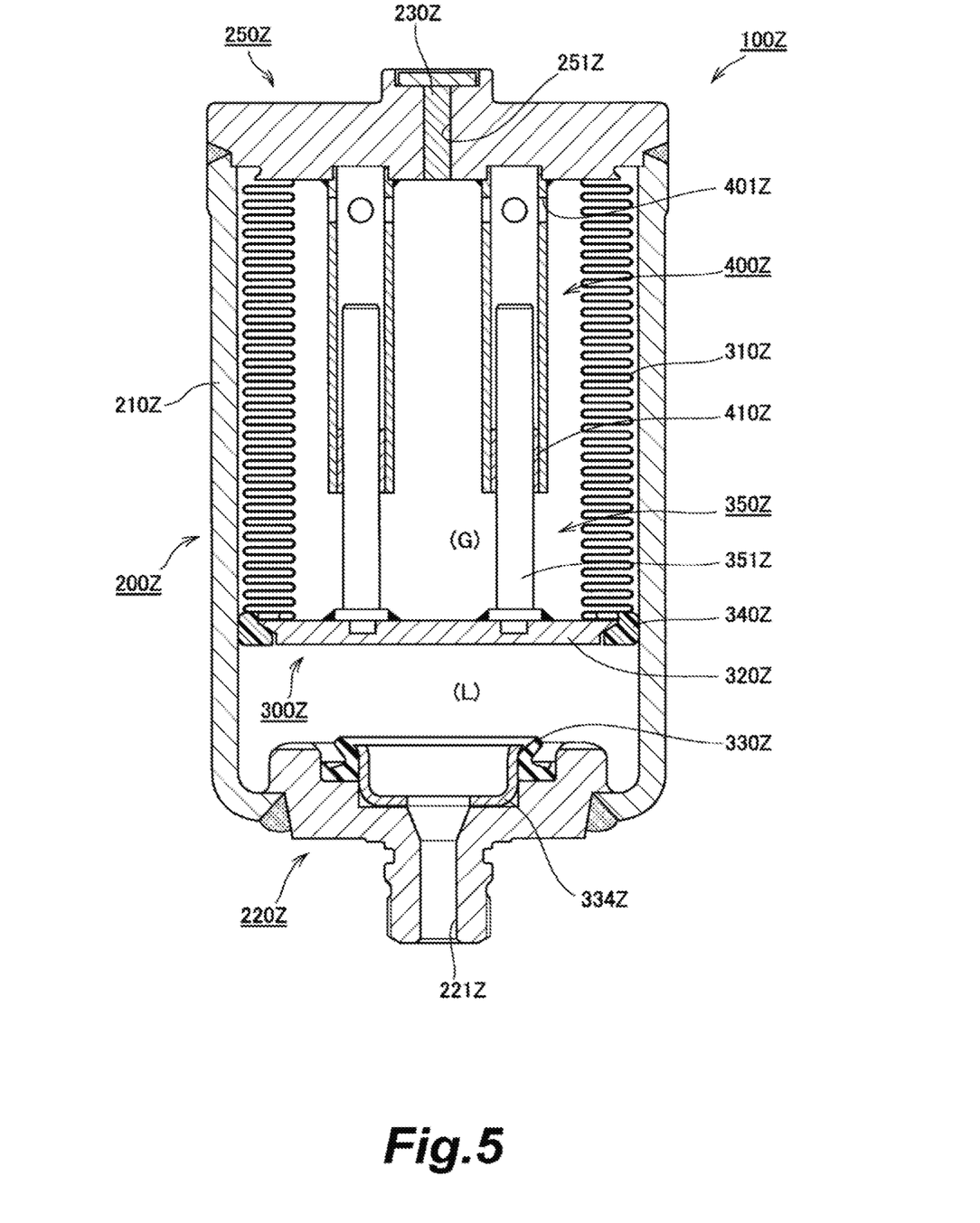
FIG. 5 is a schematic cross-sectional view of an accumulator according to Embodiment 4 of the present disclosure.

FIG. 5 shows Embodiment 4 of the present disclosure. FIG. 5 is a schematic cross-sectional view of an accumulator according to Embodiment 4 of the present disclosure, and shows a state in which the metal bellows is positioned in the middle between a position when the metal bellows is expanded and a position when the metal bellows is contracted.

<Entire Accumulator>

A description will be given of the overall configuration of the accumulator according to Embodiment 4 of the present disclosure. An accumulator 100Z according to the present embodiment includes a pressure vessel 200Z, a partition unit 300Z which is provided in the pressure vessel 200Z and partitions the pressure vessel 200Z into a fluid chamber (L) in which working fluid flows and a gas chamber (G) in which gas is sealed, and sleeves 400Z as annular members which are disposed in the partition unit 300Z.

The pressure vessel 200Z is formed of metal, and is constituted by a tubular pressure vessel main body 210Z, a port formation member 220Z which is provided so as to cover one opening portion of the pressure vessel main body 210Z, and an end cover 250Z which is provided so as to cover the other opening portion. The body portion of the pressure vessel main body 210 is cylindrical. An injection hole 251Z for injection of gas is provided in the end cover 250Z. After the gas is injected, a plug 230Z is press-fitted into the injection hole 251Z. In addition, a port 221Z serving as an entrance and exit of the working fluid is provided in the port formation member 220Z.

Each of the sleeves 400Z is constituted by a substantially cylindrical member which has one end fixed to the end cover 250Z. The sleeve 400Z is provided with a plurality of through holes 401Z such that the gas can freely move between the inside and the outside of the tube. In the present embodiment, two sleeves 400Z are provided, but the number of the sleeves is not limited thereto in the present disclosure.

The partition unit 300Z includes a tubular metal bellows 310Z which has one end side fixed to the end cover 250Z, and a bellows cap 320Z which is fixed to the other end side of the metal bellows 310Z.

The metal bellows 310Z is a pleated substantially cylindrical member in which a plurality of annular ridge portions and a plurality of annular valley portions are alternately formed. The metal bellows 310Z is configured so as to expand and contract according to the pressure in a fluid chamber (L) and the pressure in a gas chamber (G).

Space in the pressure vessel 200Z is separated into the gas chamber (G) and the fluid chamber (L) by the thus configured metal bellows 310Z and the bellows cap 320Z fixed to the other end side of the metal bellows 310Z. Herein, a specific amount of the gas is sealed in the gas chamber (G). The fluid pressure in the fluid chamber (L) changes according to the flow of the working fluid. Thus the metal bellows 310Z expands and contracts so as to maintain the balance between the pressure in the gas chamber (G) and the fluid pressure in the fluid chamber (L).

A seal member 330Z is provided between the bellows cap 320Z and the port 221Z. More specifically, in the present embodiment, the seal member 330Z is fixed to the surface of the port formation member 220Z on a side opposing the bellows cap 320Z. A seal holder 334Z which holds the seal member 330Z is provided on the inner peripheral surface side of the seal member 330Z. Note that the seal member 330Z according to the present embodiment is constituted by a rubbery elastic body having a seal lip. In the present embodiment, when the metal bellows 310Z expands, the bellows cap 320Z comes into close contact with the seal member 330Z, whereby sealing is performed. That is, when the fluid pressure in the fluid chamber (L) is not more than a specific value, the metal bellows 310Z expands, and the bellows cap 320Z and the seal member 330Z come into close contact with each other. Consequently, part of the working fluid flowing in the fluid chamber (L) is trapped in annular space formed by the bellows cap 320Z, the inner wall surface of the pressure vessel 200Z, the seal member 330Z, the outer peripheral surface of the metal bellows 310Z, and the like. That is, the seal member 330Z exerts the function of sealing the working fluid on the side of the fluid chamber (L) via the metal bellows 310Z when the metal bellows 310Z expands. Consequently, a state in which the fluid pressure (liquid pressure) in the annular space is substantially equal to the pressure (air pressure) on the inner peripheral surface side of the metal bellows 310Z is maintained, and the metal bellows 310Z is prevented from being deformed.

In addition, a sliding ring 340Z which also has the bearing function is provided on the outer periphery of the bellows cap 320Z. As a material of the sliding ring 340Z, metal, resin, and rubber may be used. The outer peripheral surface of the sliding ring 340Z is configured so as to be slidable relative to the inner peripheral surface of the pressure vessel main body 210Z. This enables the metal bellows 310Z to expand and contract smoothly and the vibration of the metal bellows 310Z to be suppressed. Note that an area outside the outer peripheral surface of the metal bellows 310Z is also part of the fluid chamber (L), and hence the sliding ring 340Z is configured so as not to prevent the working fluid from flowing. For example, it is possible to adopt a configuration in which gaps are provided at several locations in the circumferential direction between the outer peripheral surface of the sliding ring 340Z and the inner peripheral surface of the pressure vessel main body 210Z.

In the accumulator 100Z according to the present embodiment as well, there is provided the centering mechanism which performs the centering of the bellows cap 320Z with respect to the pressure vessel 200Z. Hereinbelow, the centering mechanism will be described in detail.

<Centering Mechanism>

The centering mechanism according to the present embodiment has a sliding unit 350Z which is fixed to the bellows cap 320Z and slides in the expansion/contraction direction of the metal bellows 310Z relative to the sleeve 400Z when the metal bellows 310Z expands and contracts.

The sliding unit 350Z according to the present embodiment is constituted by a rod 351Z as a fixed member which has one end fixed to the bellows cap 320Z. The rod 351Z is configured so as to slide relative to a bearing 410Z provided on the inner peripheral surface of the sleeve 400Z. As a material of the bearing 410Z, metal, resin, and rubber may be used.

<Advantages of the Accumulator According to the Present Embodiment>

According to the thus configured accumulator 100Z according to the present embodiment, there is provided the centering mechanism having the sliding unit 350Z which is fixed to the bellows cap 320Z and slides relative to the sleeve 400Z. Consequently, the tilt of the bellows cap 320Z is suppressed, and it is possible to suppress the tilt of the metal bellows 310Z. Therefore, it is possible to prevent the metal bellows 310Z from colliding with the pressure vessel 200Z (the pressure vessel main body 210Z). In addition, with the centering effect by the sliding unit 350Z, it is possible to stabilize the seating position of the seal member 330Z with respect to the bellows cap 320Z in the state in which the metal bellows 310Z is expanded. Thus it becomes possible to reliably perform the sealing.

In addition, the sliding ring 340Z which is configured so as to be slidable relative to the inner peripheral surface of the pressure vessel 200Z (the pressure vessel main body 210Z) is provided on the outer periphery of the bellows cap 320Z, and hence the tilt of the metal bellows 310Z is further suppressed.

| REFERENCE SIGNS LIST | |
| --- | --- |
| 100, 100X, 100Y, 100Z | Accumulator |
| 200, 200Z | Pressure vessel |
| 210, 210Z | Pressure vessel main body |
| 211, 251Z | Injection hole |
| 220, 220Z | Port formation member |
| 221, 221Z | Port |
| 230, 230Z | Plug |
| 240 | Plug guide |
| 250Z | End cover |
| 300, 300X, 300Y, 300Z | Partition unit |
| 310, 310Z | Metal bellows |
| 320, 320X, 320Z | Bellows cap |
| 321 | Concave portion |
| 330, 330X, 330Z | Seal member |
| 331, 331X | Substantially disk-shaped member |
| 332, 332X | Rubbery elastic body |
| 333X | Insertion hole |
| 340, 340Z | Sliding ring |
| 350, 350Z | Sliding unit |
| 351 | Fixed member |
| 351Z | Rod |
| 351a | Flow path hole |
| 352 | Sliding member |
| 360 | Sliding unit |
| 361 | Rod |
| 362 | Sliding member |
| 362a | Fitting hole |
| 362b | Flow path hole |
| 363 | Sliding portion |
| 370 | Rod |

-continued

| REFERENCE SIGNS LIST | |
|---|---|
| 371 | First passage |
| 372 | Second passage |
| 400 | Stay |
| 400Z | Sleeve |
| 401Z | Through hole |
| 410 | Tubular portion |
| 410Z | Bearing |
| 420 | Bottom plate portion |
| 421 | Through hole |
| 430 | Bearing |

The invention claimed is:

1. An accumulator comprising:
a pressure vessel having a port serving as an entrance and an exit of a working fluid;
a partition unit provided in the pressure vessel and partitioning the pressure vessel into a fluid chamber, in which the working fluid flows, and a gas chamber, in which gas is sealed; and
an annular member disposed in the partition unit and fixed to the pressure vessel, wherein
the partition unit includes:
a tubular metal bellows, one end side of which is fixed to the pressure vessel and which expands and contracts according to pressure in the fluid chamber and pressure in the gas chamber; and
a bellows cap which is fixed to another end side of the metal bellows,
the partition unit further includes:
a seal member which is provided between the bellows cap and the port and seals the working fluid on a side of the fluid chamber via the metal bellows when the metal bellows expands and contracts; and
a sliding unit which is fixed to the bellows cap and slides in an expansion/contraction direction of the metal bellows relative to the annular member;
the sliding unit includes:
a fixed member, one end of which is fixed to the bellows cap, and
a sliding member which is provided on another end side of the fixed member and slides relative to an outer peripheral surface of the annular member,
the fixed member is a tubular member which is provided on a port side of the bellows cap and is provided with a flow path which allows moving in and out of the working fluid therethrough, and
the sliding member is provided on an inner wall surface of the tubular member.

2. An accumulator comprising:
a pressure vessel having a port serving as an entrance and an exit of a working fluid;
a partition unit provided in the pressure vessel and partitioning the pressure vessel into a fluid chamber, in which the working fluid flows, and a gas chamber, in which gas is sealed; and
an annular member disposed in the partition unit and fixed to the pressure vessel, wherein
the partition unit includes:
a tubular metal bellows, one end side of which is fixed to the pressure vessel and which expands and contracts according to pressure in the fluid chamber and pressure in the gas chamber; and
a bellows cap which is fixed to another end side of the metal bellows, the partition unit further includes:
a seal member which is provided between the bellows cap and the port and seals the working fluid on a side of the fluid chamber via the metal bellows when the metal bellows expands and contracts; and
a sliding unit which is fixed to the bellows cap and slides in an expansion/contraction direction of the metal bellows relative to the annular member,
wherein the sliding unit includes:
a fixed member which, one end of which is fixed to the bellows cap; and
a sliding member which is provided on another end side of the fixed member and slides relative to an inner peripheral surface of the annular member;
wherein the sliding member is provided on a port side of the bellows cap and is provided with a flow path which allows moving in and out of the working fluid therethrough, and
a sliding portion which slides relative to the inner peripheral surface of the annular member is provided on an outer peripheral surface side of the sliding member.

3. An accumulator comprising:
a pressure vessel having a port serving as an entrance and an exit of a working fluid;
a partition unit provided in the pressure vessel and partitioning the pressure vessel into a fluid chamber, in which the working fluid flows, and a gas chamber, in which gas is sealed; and
an annular member disposed in the partition unit and fixed to the pressure vessel, wherein
the partition unit includes:
a tubular metal bellows, one end side of which is fixed to the pressure vessel and which expands and contracts according to pressure in the fluid chamber and pressure in the gas chamber; and
a bellows cap which is fixed to another end side of the metal bellows,
the partition unit further includes:
a seal member which is provided between the bellows cap and the port and seals the working fluid on a side of the fluid chamber via the metal bellows when the metal bellows expands and contracts; and
a sliding unit which is fixed to the bellows cap and slides in an expansion/contraction direction of the metal bellows relative to the annular member;
wherein one end of the annular member is fixed to an inner wall surface on a port side in the pressure vessel, and another end of the annular member has a bottom plate portion, in which a through hole is formed, and
the sliding unit includes a fixed member which is fixed to the bellows cap and is disposed so as to be slidable relative to a bearing provided on an inner peripheral surface of the through hole.

4. The accumulator according to claim 3, wherein the fixed member is provided with a flow path which allows moving in and out of the working fluid therethrough.

5. An accumulator comprising:
a pressure vessel having a port serving as an entrance and an exit of a working fluid;
a partition unit provided in the pressure vessel and partitioning the pressure vessel into a fluid chamber, in which the working fluid flows, and a gas chamber, in which gas is sealed; and an annular member disposed in the partition unit and fixed to the pressure vessel, wherein the partition unit includes:

a tubular metal bellows, one end side of which is fixed to the pressure vessel and which expands and contracts according to pressure in the fluid chamber and pressure in the gas chamber; and a bellows cap which is fixed to another end side of the metal bellows, the partition unit further includes:

a seal member which is provided between the bellows cap and the port and seals the working fluid on a side of the fluid chamber via the metal bellows when the metal bellows expands and contracts; and a sliding unit which is fixed to the bellows cap and slides in an expansion/contraction direction of the metal bellows relative to the annular member; and wherein the sliding unit includes a fixed member, one end of which is fixed to the bellows cap and which slides relative to a bearing provided on an inner peripheral surface of the annular member.

6. The accumulator according to claim 1, wherein a sliding ring which is configured so as to be slidable relative to an inner peripheral surface of the pressure vessel is provided on an outer periphery of the bellows cap.

7. The accumulator according to claim 2, wherein a sliding ring which is configured so as to be slidable relative to an inner peripheral surface of the pressure vessel is provided on an outer periphery of the bellows cap.

8. The accumulator according to claim 3, wherein a sliding ring which is configured so as to be slidable relative to an inner peripheral surface of the pressure vessel is provided on an outer periphery of the bellows cap.

9. The accumulator according to claim 5, wherein a sliding ring which is configured so as to be slidable relative to an inner peripheral surface of the pressure vessel is provided on an outer periphery of the bellows cap.

* * * * *